MAGNETIC RECORDING MEDIUM UTILIZING MICROSCOPIC CAPSULES CONTAINING MAGNETIC MATERIAL

Filed June 25, 1962

INVENTORS
GEORGE T. BROWN JR.
JOSEPH A. BAKAN &
DAVID J. STRILEY

BY Louis A. Kline
John J. Callahan
THEIR ATTORNEYS

United States Patent Office 3,221,315

Patented Nov. 30, 1965

3,221,315

MAGNETIC RECORDING MEDIUM UTILIZING MICROSCOPIC CAPSULES CONTAINING MAGNETIC MATERIAL

George T. Brown, Jr., Joseph A. Bakan, and David J. Striley, Dayton, Ohio, assignors to The National Cash Register Company, Dayton, Ohio, a corporation of Maryland Filed June 25, 1962, Ser. No. 204,804
4 Claims. (Cl. 340—174.1)

This invention relates generally to a magnetic recording medium, and more particularly to a magnetic-field-sensitive recording medium capable of having produced thereon visual recordings of various kinds of information by subjecting selected areas of the recording medium to the action of a magnetic field to produce visual recordings in those selected areas.

It is an object of the present invention to provide a recording medium capable of having produced thereon permanent but erasable visual recordings as the result of subjecting the said recording medium to a magnetic field.

It is another object of the present invention to provide a magnetic-field-sensitive recording medium capable of having produced thereon visual recordings in selected areas of the magnetic-field-sensitive recording medium as the result of subjecting the recording medium to various forms of magnetic fields.

It is still another object of the present invention to provide a recording medium capable of having produced thereon, as the result of subjecting selected areas of the recording medium to a magnetic field, visual recordings in selected areas thereof, where the recording medium has a magnetic-field-sensitive coating or layer which contains discrete fluid inclusions having mobile magnetic material entrapped therein.

Other objects of this invention will become apparent as the description of the invention proceeds.

The objects of this invention are accomplished by providing a recording medium having a magnetic-field-sensitive coating with selected areas of the coating capable of being subjected to the action of a magnetic field to produce visual recordings in those selected areas. The magnetic-field-sensitive coating comprises discrete fluid inclusions or capsules having mobile magnetic material entrapped therein. When a recording magnetic field is brought into close proximity to selected areas of the recording medium, the magnetic material of the fluid inclusions in the selected areas is oriented by the recording magnetic field in a substantially similar direction. As a result, the magnetic-field-sensitive coating in the selected areas of the recording medium presents a markedly different appearance to incident light from the magnetic-field-sensitive coating in the unselected areas of the recording medium. The difference or contrast in appearance between the magnetic-field-sensitive coating in the selected areas and the unselected areas of the recording medium may be accomplished by orienting the magnetic material of the fluid inclusions in the selected areas of the recording medium by a magnetic field in a manner to cause the magnetic-field-sensitive coating in the selected areas to be either more transmisisve of light or less transmissive of light than the magnetic-field-sensitive coating in the unselected areas of the recording medium.

For example, if the magnetic material of the magnetic-field-sensitive coating is initially randomly oriented or oriented in a direction parallel to a base member of the recording medium, and the direction of the recording magnetic field is substantially perpendicular to the base member, then the magnetic material in the selected areas of the recording medium will be oriented by the recording magnetic field in a direction substantially perpendicular to the base member. Accordingly, the magnetic-field-sensitive coating in the selected areas of the recording medium will be more transmissive of light than the magnetic-field-sensitive coating in the unselected areas of the recording medium. Therefore, when the base member of the recording medium is opaque and more reflective than the magnetic material of the magnetic-field-sensitive coating, the recordings produced in the selected areas of the recording medium are observed by means of light transmitted through the magnetic-field-sensitive coating in the selected areas of the recording medium and reflected from the base member back through the magnetic-field-sensitive coating. The recordings appear in a light outline in contrast to the darker background furnished by the unselected areas of the recording medium. When the base member is opaque and more absorptive than the magnetic material of the magnetic-field-sensitive coating, the recordings produced in the selected areas of the recording medium are observed by means of light transmitted through the magnetic-field-sensitive coating in the selected areas of the recording medium and absorbed by the base member. The recordings appear in a dark outline in contrast to the lighter background furnished by the unselected areas of the recording medium. Further, when the base member is transparent, the recordings produced in the selected areas of the recording medium are observed by means of light transmitted through the magnetic-field-sensitive coating in the selected areas of the recording medium and through the transparent base member. The recordings appear in a light outline in contrast to the darker background furnished by the unselected areas of the recording medium.

For example, if the magnetic material of the magnetic-field-sensitive coating is initially randomly oriented or oriented in a direction perpendicular to the base member of the recording medium, and the direction of the recording magnetic field is substantially parallel to the base member, then the magnetic material in the selected areas of the recording medium will be oriented by the recording magnetic field in a direction substantially parallel to the base member. Accordingly, the magnetic-field-sensitive coating in the selected areas of the recording medium will be less transmissive of light than the magnetic-field-sensitive coating in the unselected areas of the recording medium. Therefore, when the base member of the recording medium is opaque and more reflective than the magnetic material of the magnetic-field-sensitive coating, the recordings produced in the selected areas of the recording medium are observed by means of light reflected by the magnetic material of the magnetic-field-sensitive coating in the selected areas of the recording medium and light transmitted through the magnetic-field-sensitive coating in the unselected areas of the recording medium and reflected from the base member back through the magnetic-field-sensitive coating. The recordings appear in a dark outline in contrast to the lighter background furnished by the unselected areas of the recording medium. When the base member of the recording medium is opaque and more absorptive than the magnetic material of the magnetic-field-sensitive coating, the recordings produced in the selected areas of the recording medium are observed by means of light reflected by the magnetic material of the magnetic-field-sensitive coating in the selected areas of the recording medium and light transmitted through the magnetic-field-sensitive coating in the unselected areas of the recording medium and absorbed by the base member. The recordings appear in a light outline in contrast to the darker background furnished by the unselected areas of the recording medium. Further, when the base member is transparent, the recordings produced in the selected areas of the recording medium are observed by means of light reflected or absorbed by the magnetic material of the margnetic-field-sensitive coating in the selected areas of the recording medium and light transmitted through the magnetic-field-sensitive coating in the unselected areas of the recording medium and through the transparent base member. The recordings appear in a dark outline in contrast to the lighter background furnished by the unselected areas of the recording medium.

The novel features which are believed to be characteristic of this invention are set forth with particularity in the appended claims. The invention itself, however, both as to its organization and as to its method of operation, together with further objects thereof, may best be understood by reference to the following description taken in connection with the accompanying drawing, in which:

Figure 1:
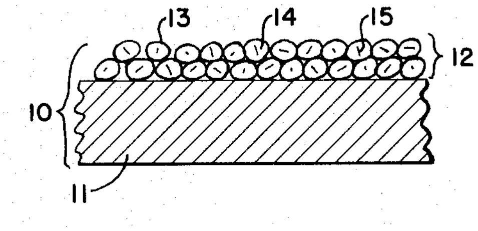
FIGURE 1 is a diagrammatic cross-sectional view of a portion of a recording medium comprising a white opaque paper base member and a magnetic-field-sensitive surface coating. The magnetic-field-sensitive coating comprises discrete fluid inclusions having mobile magnetic material entrapped therein.

Referring to FIGURE 1 of the drawing, there is shown therein a recording medium 10, which comprises a base member 11, such as paper, plastic, or non-magnetic foil, upon one surface of which member is deposited a coating or layer 12, comprising discrete fluid inclusions or capsules 13. The fluid inclusions 13 have contained therein, suspended in a liquid vehicle 14, a profusion of minute particles 15 of magnetic material, which are shown randomly oriented with respect to the base member 11.

United States Patent No. 2,971,916, which issued on the application of Lowell Schleicher and Charles S. Baughman on February 14, 1961, discloses and claims microscopic capsules having walls of hardened organic colloid material enclosing an oily liquid containing a dispersion of magnetic powder. The capsules disclosed in that United States Patent No. 2,971,916, would serve the purposes of this invention if applied to the base member 11 of the recording medium 10.

In said United States Patent No. 2,971,916, there is also shown and described a particular process for making the magnetic-material-containing capsules claimed therein. Nevertheless, that process tends to form small aggregates of capsules, while uniformly-dispersed capsules are desired in the coating 12 of the recording medium 10 in the instant embodiment. Uniformly-dispersed magnetic-material-containing capsules or fluid inclusions are preferred, since they provide better definition to any data information recorded on the recording medium 10. Accordingly, the preferred process for the making of the capsules 13 in the instant embodiment is essentially similar to that disclosed and claimed in an application for United States Letters Patent, Serial No. 137,992, filed September 14, 1961, by Carl Brynko, Joseph A. Baken, Robert E. Miller, and Joseph A. Scarpelli, and assigned to the assignee of the present application. The process of United States Patent Application Serial No. 137,992 produces uniformly-dispersed capsules and is particularly well adapted for producing individual microscopic magnetic-material-containing capsules ranging from 3 microns to 100 microns in average dimension as well as capsules of this type up to 15,000 microns in average dimension.

In this, the preferred example, there will be described the encapsulation of a suspension of magnetic iron oxide in a water-immiscible liquid of a relatively non-volatile nature. This example is given with amounts based on the use of a two-liter vessel, but such in no way limits the process, as it may be enlarged upon for commercial practice.

The wall-forming polymeric materials are pigskin gelatin having an iso-electric point of approximately pH 8.9, gum arabic, and ethylenemaleic anhydride copolymer material of two different molecular weights. During the initial part of the process, the pH of the system is adjusted to about 9.5, and the temperature is raised above the gelation temperature. The suspension of magnetic iron oxide in oil is then added, and the system is agitated until the desired drop size of the oil-in-water emulsion is attained. The pH of the system is then reduced to initiate coacervation between fractions of the polymers, the gelatin molecules having a positive net charge, and the other polymer molecules having a negative net charge.

Into a two-liter beaker are placed

| | | |
|---|---|---|
| Water | liters | 1 |
| Gelatin aqueous solution of 11% by weight, pigskin gelatin having an iso-electric point of pH 8.9 | milliliters | 180 |
| Gum arabic aqueous solution of 11% by weight, gum arabic | do | 180 |
| Ethylenemaleic anhydride copolymer (molecular weight 1500-absolute viscosity) as a 2%, by weight, aqueous solution with pH adjusted to 9 | do | 40 |
| Ethylenemaleic anhydride copolymer (molecular weight 100,000-absolute viscosity) as a 2%, by weight, aqueous solution with pH adjusted to 9 | do | 40 |

Next, the system is agitated; the temperature is raised to 40 degrees centigrade; and the pH of the system is adjusted to 9.5 with a 20% aqueous solution of sodium hydroxide. Then, 250 milliliters of a 16%, by weight, dispersion of powdered magnetic iron oxide in chlorinated diphenyl containing a small amount of surfactant is introduced into the system. The surfactant is sorbitan mono-oleate, and its purpose is to keep the iron oxide dispersed in the oil phase droplets during the encapsulation process. The system is agitated until the magnetic-material-containing oil is dispersed to a desired drop size, such as of the order of 5 microns. After this point has been reached, which should take only a few minutes, the pH of the system is reduced slowly (5 to 10 minutes), with agitation, to 7.5 to induce complex coacervation. With continued agitation, the temperature of the system is lowered to room temperature (25 degrees centigrade $\pm$ 5 degrees) over a period of 30 minutes or so, thus allowing the complex polymeric liquid material, thus formed, to deposit around each of its internal oil droplets containing the magnetic particle suspension. With continued agitation, the system is chilled to about 10 degrees centigrade, which sets the liquid wall deposit of polymeric complex material to a gelled condition. These gelled capsules are complete except for the next step, of hardening by cross-linking in the residual aqueous vehicle. The hardening is accomplished by the addition of 10 milliliters of a 25%, by weight, aqueous solution of glutaraldehyde, accompanied by stirring for one to twenty hours, during which the temperature of the capsular slurry is allowed to rise to the ambient room temperature. This dispersion of capsules and the aqueous medium then is coated on the base member 11 and dried, the individual capsules 13 maintaining their integrity and each having within it mobile magnetic material, as described. Any conventional coating techniques, such as spray-coating or bar-draw-down coating techniques, may be used to coat the magnetic-material-containing capsules 13 on the base member 11.

In the preferred process for making the magnetic-material-containing capsules 13 just described, the magnetic-material-containing oil is introduced into the system before complex coacervation is commenced. It has been found that this procedure is preferred when capsules having a diametric size under 100 microns are desired. Individual capsules having diameters of 5 microns have been made by use of the process described above, and, when these capsules were coated on a base member, a recording medium was provided having a very fine resolution, depending upon the size of the capsules 13.

The magnetic particles 15 may be of any desired material. Some examples of magnetic material are flake iron, black or red magnetic iron oxide, carbonyl iron, ferromagnetic alloys, nickel and its magnetic alloys, cobalt and its magnetic alloys, or any mixture of the aforementioned. In the instant embodiment, it is preferred that the magnetic particles 15 have sufficient coercivity to keep the magnetic particles in selected areas of the recording medium oriented in a substantially similar direction, as the result of being subjected to a recording magnetic field, until purposely reoriented by other recording or erasing magnetic fields.

As pointed out heretofore, the magnetic particles 15 are suspended in a liquid vehicle 14. The liquid vehicle 14 is preferably an oily vehicle. Among the preferred oils, because of their inertness and low cost, are chlorinated diphenyl, light petroleum fractions, or any equivalent oily solvent which does not attack the magnetic particles 15 or the walls of the capsules 13.

Figure 2:
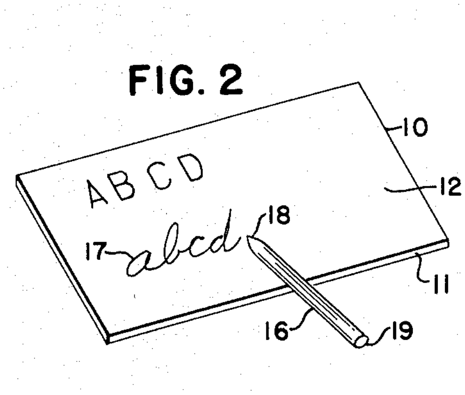
FIGURE 2 is a perspective view of a recording medium of the type shown in FIGURE 1, and a stylus-type of recording means, illustrating the principle of the invention.

Referring now to FIGURE 2, reference character 16 designates a permanent magnet stylus which is assumed to be movable either closely adjacent to or in contact with the recording medium 10, so that recordings, such as that indicated at 17, may be made to appear visually as a brightness change effect.

One pole 18 of the magnet 16 is shown positioned adjacent to a selected area of the recording medium 10. The magnetic field produced by the magnet 16 extends along a curved path joining the two poles 18 and 19 of the magnet 16. The direction of penetration of the magnetic field into the selected area of the recording medium 10 is oriented with respect to the background or surrounding areas of the recording medium 10. The magnetic particles 15 in each of the capsules 13 in the areas of the coating 12 that are closely adjacent to or in contact with the magnet pole 18 are oriented by the magnetic field in a substantially similar direction, which for the example shown in FIGURE 2 extends from the pole 18 at an angle with respect to the base member 11 of the recording medium 10. The magnetic particles 15 oriented by the magnetic field of the stylus 16 in the selected areas of the recording medium 10 present an appearance to incident light which is markedly different from the appearance of the magnetic particles 15 of the unselected areas.

After preparation of the recording medium 10 by the process described heretofore, the magnetic particles 15 of the capsules 13 normally are randomly oriented with respect to the base member 11, but, in order to insure that the coating 12 is of uniform appearance to incident light, it may be subjected by any suitable transducer means to a prebiasing step similar to any of the ordinary erasing techniques used in conventional magnetic tape technology. The same transducer means may also be utilized to return the coating 12 to a uniform appearance and thereby erase recordings or data from the recording medium 10 prior to the commencement of another recording operation.

Figure 5:
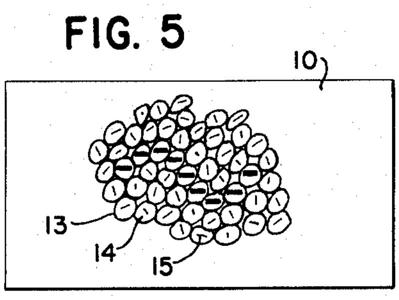
FIGURE 5 is a top view of a recording medium such as that shown in FIGURE 1, useful in understanding and explaining the change of appearance occurring in the magnetic-field-sensitive coating in selected areas of the recording medium and produced by a recording means such as that shown in FIGURE 3.
Figure 3:
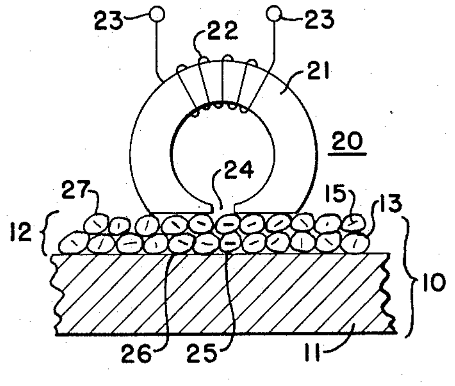
FIGURE 3 is a diagrammatic view of the recording medium shown in FIGURE 1 together with a recording means of a type suitable for orienting the magnetic material of the fluid inclusions in selected areas of the recording medium in a direction substantially parallel to the base member.

FIGURE 3 shows a magnetic recording head 20 of the ring type. The magnetic head 20 comprises a magnetic core 21 and a winding 22 having terminals 23 for connection to a suitable source (not shown) of direct or other recording current potential. The recording head 20 is provided with a narrow air gap 24, which is positioned closely adjacent to the coating 12 of the recording medium 10. The magnetic field produced across the air gap 24 is in a direction substantially parallel to the base member 11 of the recording medium 10. The recording head 20, when positioned as shown in FIGURE 3, causes the magnetic particles 15 in each of the capsules 13 in selected areas of the recording medium 10, which capsules 13 are also within the length of the air gap 24, to be magnetized in parallel or oriented in a substantially similar direction, which, as shown in FIGURE 3, is also parallel to the base member 11. In FIGURE 3, the magnetic particles in the capsules 13 at 25, which are within the length of the air gap 24, are shown oriented parallel to the base member 11, the magnetic particles in the capsules 13 at 26, which are barely outside of the effective length of the air gap 24, are shown oriented in the direction of the magnetic field at some angle to the base member 11, and the magnetic particles in the capsules 13 at 27, being outside the area of influence of the magnetic recording field, are unaffected by the magnetic field. The oriented magnetic particles 15 in the selected areas of the recording medium 10, which also are within the air gap 24, present an appearance to incident light which is markedly different from the appearance of the magnetic particles 15 outside of the influence of the magnetic recording field. This difference in appearance is illustrated in FIGURE 5, where it is assumed that the recording head 20 is moved adjacent the surface of the coating 12 in a manner to record in optical contrast a sine wave image on the recording medium 10.

Figure 4:
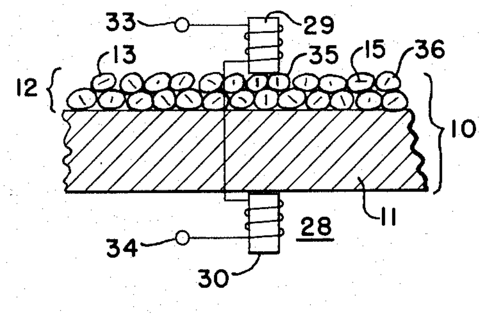
FIGURE 4 is a diagrammatic view of the recording medium shown in FIGURE 1 together with a recording means of a type suitable for orienting the magnetic material of the fluid inclusions in selected areas of the recording medium in a direction substantially perpendicular to the base member.

FIGURE 4 shows a magnetic recording head 28 of the double pole-piece type. The magnetic head 28 comprises a pair of magnetic cores 29 and 30, which are positioned, as an example, exactly opposite each other, with the recording medium 10 located therebetween. A winding 31 and 32 is provided for each of the cores. The windings 31 and 32 are connected together, and terminals 34 and 35 are provided for connection to a suitable source (not shown) of direct or other recording current potential. The magnetic field produced between the cores 29 and 30 is in a direction of substantially perpendicular to the base member 11 of the recording medium 10. The magnetic particles 15 in each of the capsules 13 in the selected areas of the recording medium 10, between the cores 29 and 30, are oriented in a substantialy similar direction, which, as shown in FIGURE 4, is perpendicular to the base member 11. In FIGURE 4, the magnetic particles 15 in the capsules 13 at 35, which are between the cores 29 and 30, are shown oriented perpendicular to the base member 11, while the magnetic particles 15 in the capsules 13 at 36 are unexposed to the magnetic recording field and remain randomly or prebiased oriented. Those oriented magnetic particles 15 located in the selected area of the recording medium 10 between the cores 29 and 30 present an appearance to incident light which is markedly different from the appearance of the magnetic particles 15 in adjacent areas which were not exposed to the influence of the magnetic recording field of the recording head 28.

In its broad scope and in accordance with the foregoing description, the invention contemplates the use of a magnetic-field-sensitive coating, layer, or film having fluid inclusions or capsules which have light-translucent walls, a liquid vehicle which also is light-translucent, and magnetic particles which are substantially opaque. The magnetic material contained within the fluid inclusions or capsules may be essentally light-reflective or light-absorptive. The recording medium may comprise a base member or support for the magnetic-field-sensitive coating, and this base member may be opaque or transparent. The recording medium may comprise also a film or coating comprising magnetic-material-containing capsules and a transparent binder. The recording medium, whether having a base member or not, may be attached or applied to a conventional magnetic recording medium such as a magnetic tape. When magnetic signals are recorded on the magnetic tape in a conventional manner, visual recordings of these signals are also produced on the recording medium in the areas where the signals are recorded. The visible recording medium may be removed or stripped from the magnetic tape and used separately as a photographic, radiation-opaque or reflux optical master to make additional copies of the visual recordings.

It is evident from a consideration of the foregoing discussion of the invention and its operation that a simple and very effective method of magnetic recording is provided which permits the recording of permanent but erasable visual information on a reusable medium. The reusable medium may be permanently attached to another recording medium or removably associated therewith. Therefore, those novel features which are believed descriptive of the invention are defined with particularity in the appended claims.

What is claimed is:

1. A recording medium comprising
a base member having a fixed light-responsive characteristic, and
a magnetic-field-sensitive coating carried by said base member,
said magnetic-field-sensitive coating comprising individual light-transmitting microscopic capsules uniformly dispersed throughout said coating,
each of said capsules having a wall of hardened colloid material enclosing an oily liquid containing a dispersion of magnetic particles orientable with respect to said base member by a magnetic field,
said magnetic-field-sensitive coating having a variable light-responsive characteristic variable with respect to said fixed light-responsive characteristic of said base member as determined by orientation of said magnetic particles with respect to said base member,
said base member and said magnetic-field-sensitive coating cooperating to produce visual recordings in areas of said recording medium where said magnetic particles are orientated differently from said magnetic particles in other areas.

2. A recording medium comprising
a base member having a fixed light-responsive characteristic, and
a magnetic-field-sensitive coating carried by said base member,
said magnetic-field-sensitive coating comprising discrete light-transmitting fluid inclusions uniformly dispersed throughout said coating,
each of said fluid inclusions having mobile magnetic particles entrapped therein orientatable with respect to said base member by a magnetic field, said magnetic-field-sensitive coating having a variable light-responsive characteristic variable with respect to said fixed light-responsive characteristic of said base member as determined by orientation of said magnetic particles with respect to said base member,
said base member and said magnetic-field-sensitive coating cooperating to produce visual recordings in areas of said recording medium where said magnetic particles are orientated differently from said magnetic particles in other areas.

3. A recording medium comprising
an opaque base member having a fixed light-responsive characteristic, and
a magnetic-field-sensitive coating carried by said base member,
said magnetic-field-sensitive coating comprising discrete light-transmitting fluid inclusions uniformly dispersed throughout said coating,
each of said fluid inclusions having mobile magnetic particles entrapped therein orientatable with respect to said base member by a magnetic field,
said magnetic-field-sensitive coating having a variable light-resposive characteristic variable with respect to said fixed light-responsive characteristic of said base member as determined by orientation of said magnetic particles with respect to said base member,
said base member and said magnetic-field-sensitive coating cooperating to produce visual recordings in areas of said recording medium where said magnetic particles are orientated differently from said magnetic particles in other areas.

4. A recording medium comprising
a transparent base member having a fixed light-responsive characteristic, and
a magnetic-field-sensitive coating carried by said base member,
said magnetic-field-sensitive coating comprising discrete light-transmitting fluid inclusions uniformly dispersed throughout said coating,
each of said fluid inclusions having mobile magnetic particles entrapped therein orientatable with respect to said base member by a magnetic field,
said magnetic-field-sensitive coating having a variable light-responsive characteristic variable with respect to said fixed light-responsive characteristic of said base member as determined by orientation of said magnetic particles with respect to said base member,
said base member and said magnetic-field-sensitive coating cooperating to produce visual recordings in areas of said recording medium where said magnetic particles are oriented differently from said magnetic particles in other areas.

References Cited by the Examiner

UNITED STATES PATENTS

| | | | |
|---|---|---|---|
| 2,784,392 | 3/1957 | Chaimowicz | 340—174.1 |
| 2,856,284 | 10/1958 | Hamm | 178—6.6 |
| 2,971,916 | 2/1961 | Schleicher et al. | 117—36.1 |
| 2,991,452 | 7/1961 | Welsh | 340—174.1 |
| 3,106,155 | 10/1963 | Eastman et al. | 346—74 |
| 3,106,607 | 10/1963 | Newell | 178—6.6 |

IRVING L. SRAGOW, *Primary Examiner.*

BERNARD KONICK, *Examiner.*